United States Patent
Mundra et al.

(10) Patent No.: US 10,560,428 B2
(45) Date of Patent: Feb. 11, 2020

(54) FLEXIBLE HYBRID FIREWALL ARCHITECTURE

(71) Applicant: TEXAS INSTRUMENTS INCORPORATED, Dallas, TX (US)

(72) Inventors: Amritpal Singh Mundra, Allen, TX (US); Brian J. Karguth, Van Alstyne, TX (US); Timothy Anderson, University Park, TX (US); Kai Chirca, Dallas, TX (US); Charles Fuoco, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 74 days.

(21) Appl. No.: 15/679,307

(22) Filed: Aug. 17, 2017

(65) Prior Publication Data

US 2019/0058691 A1 Feb. 21, 2019

(51) Int. Cl.
*H04L 29/06* (2006.01)

(52) U.S. Cl.
CPC ...... *H04L 63/0218* (2013.01); *H04L 63/0236* (2013.01); *H04L 63/0245* (2013.01)

(58) Field of Classification Search
CPC ............. H04L 63/0218; H04L 63/0236; H04L 63/0245
USPC ........................................................ 726/11
See application file for complete search history.

(56) References Cited

U.S. PATENT DOCUMENTS

| | | | | |
|---|---|---|---|---|
| 6,101,608 A * | 8/2000 | Schmidt | ................. | H04L 12/12 726/2 |
| 7,127,741 B2 * | 10/2006 | Bandini | ................. | G06Q 10/00 726/14 |
| 7,380,274 B2 * | 5/2008 | Dickinson, III | ........ | H04L 51/12 726/14 |
| 8,695,066 B1 * | 4/2014 | Clark | ..................... | G06F 21/00 726/4 |
| 8,713,668 B2 * | 4/2014 | Cooper | ............... | H04L 63/0209 726/14 |
| 9,112,830 B2 * | 8/2015 | Cooper | ............... | H04L 63/0254 |
| 9,628,444 B1 * | 4/2017 | Glazemakers | ...... | H04L 63/0236 |
| 2002/0053020 A1 * | 5/2002 | Teijido | ................ | H04L 63/0209 713/153 |
| 2007/0266149 A1 * | 11/2007 | Cobb | .................. | H04L 41/5009 709/224 |
| 2011/0321151 A1 * | 12/2011 | Gluck | ................ | H04L 63/0227 726/11 |
| 2014/0250232 A1 * | 9/2014 | Liu | ..................... | H04L 41/0896 709/226 |
| 2018/0367578 A1 * | 12/2018 | Verma | .................. | H04L 63/205 |

* cited by examiner

*Primary Examiner* — David J Pearson
*Assistant Examiner* — Badridot Champakesanatusptodotgov
(74) *Attorney, Agent, or Firm* — Kenneth Liu; Charles A. Brill; Frank D. Cimino (57) ABSTRACT

A flexible hybrid firewall architecture that allows a mix of firewalls at end points in front of a target and at the initiator points. Groups of Priv-IDs may be created where each group is isolated from other worlds, with all firewalls controlled by a device management and security module.

10 Claims, 9 Drawing Sheets

FLEXIBLE HYBRID FIREWALL ARCHITECTURE

TECHNICAL FIELD OF THE INVENTION

The technical field of this invention is firewall architecture.

BACKGROUND OF THE INVENTION

Robust System on a chip (SoC) security requires hardware enforced isolation where a non-secure/non-trusted entity cannot access secure resources [Modules, SRAM regions, DDR regions, DMA, IPs, etc.]. These security firewall checks must be comprehensive to ensure any individual SoC resource can be marked selectively secure thereby providing the ability to restrict access to that given resource. The firewall architecture must also have the flexibility to address various security tiers even within a secure world and must support a multi-tier firewall architecture to isolate one secure world from another secure world as well as from non-secure worlds.

SUMMARY OF THE INVENTION

The Hybrid Firewall Architecture allows a mix of firewall blocks at both the end-point (in front of a target/slave) and at an initiator side (at the egress paths of masters) to create an overall firewall system. The Hybrid architecture is optimized so a higher number of protection regions can be created with limited modules at the master point, and end-point firewalls ensure security for a given target/slave.

The flexible firewall architectures allow creating groups using Privilege-IDs (Priv-ID), and each group can be assigned a resource(s) that remains isolated from other worlds. Multiple Groups are allowed within any given world.

All firewall modules (end-point firewall or initiator-side firewall) are exclusively controlled by a single Device Management and Security Control (DMSC) module via dedicated security interconnects to provide a unified view to the application software for all firewall configurations.

Firewall modules are capable of extensive configuration to allow not only secure/non-secure world isolation but also the ability to create isolation based on user, supervisor and debug modes. Multi-tier isolation may be created within given worlds with two or more secure worlds capable of co-existing.

BRIEF DESCRIPTION OF THE DRAWINGS

These and other aspects of this invention are illustrated in the drawings, in which.

DETAILED DESCRIPTION OF PREFERRED EMBODIMENTS

Initiator-side Security Control (ISC) and Firewalls (FW) modules are important security mechanisms that allow every transaction in a security world to be assigned a source ID, so that downstream (target) security mechanism can use this information to carry out selective processing based on source and access type. This concept allows the security architecture to support multi-tier security and provide segregation of secure and non-secure worlds.

All configurations of ISCs and Firewalls are under the exclusive control of the DMSC using dedicated security interconnects.

The number of ISC and Firewall blocks and placement of these blocks are based on the topology of any particular device and may change from device to device. ISC and Firewall blocks may be placed in host modules or may be part of the interconnect.

Figure 1:
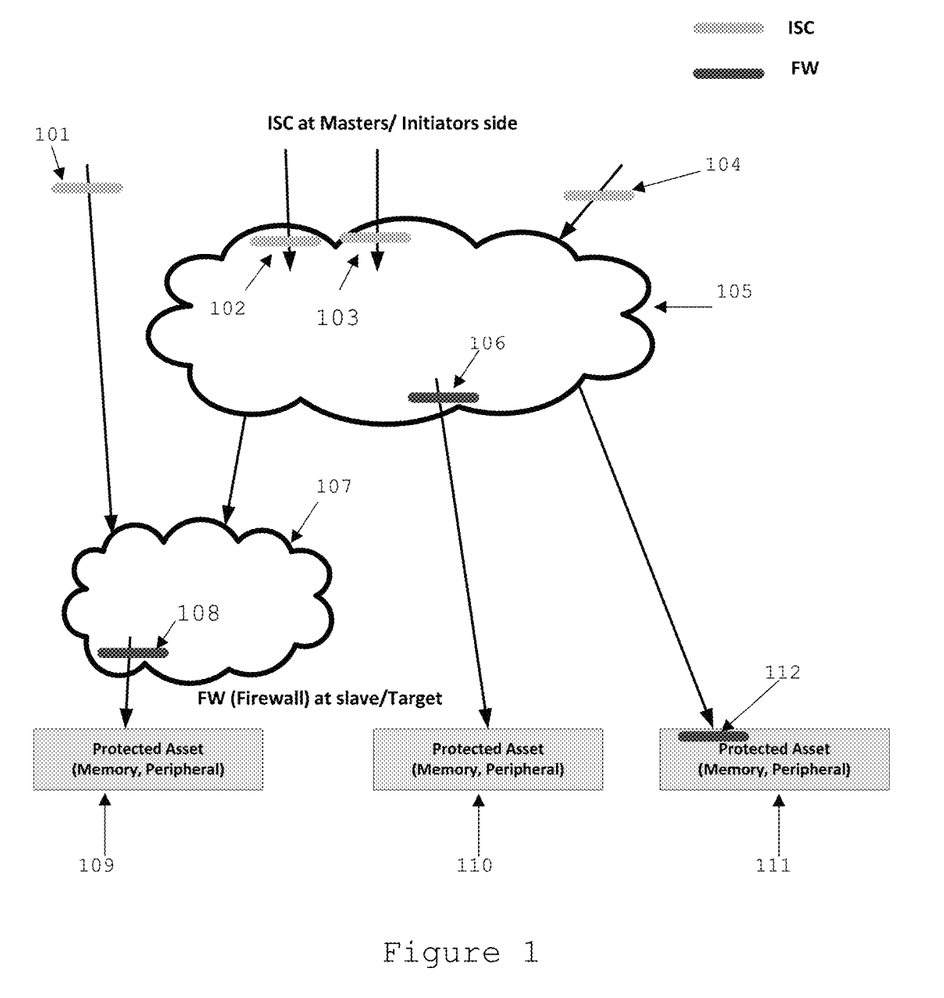
FIG. 1 shows a conceptual diagram of the hybrid firewall architecture.

FIG. 1 shows a high-level representation of a system protected by the hybrid firewall architecture described here. Initiator side security control modules 101, 102, 103 and 104 are implemented at initiator sides where the transactions originate. ISCs control the security attributes that are applied to outgoing transactions and have the ability to override security settings under the exclusive control of the DMSC module.

The ISC module will attach a Priv-ID to the transactions. The Priv-ID is a source ID whose purpose is to identify the source of the transaction to the system. Priv-IDs could be grouped by the DMSC to form logical security groups. The ISC module will also set the assert, de-assert or pass-through secure bit, and the assert, de-assert or pass-through Priv bits.

ISC may either be built into Master/Initiator module as shown on 101 and 104 or may be attached to a port where the master/initiator enters SoC fabric as shown in 102 and 103. The firewall module 112 may be at the entrance to the target 111, or at the exit from the SoC fabric as shown by 106 and 108.

The ISC is thus connected to the security fabric and can be exclusively configured by the DMSC. The ISC optionally can support region and channel number based security control, in which based on the incoming channel or address information, the associated security controls are applied.

Figure 2:
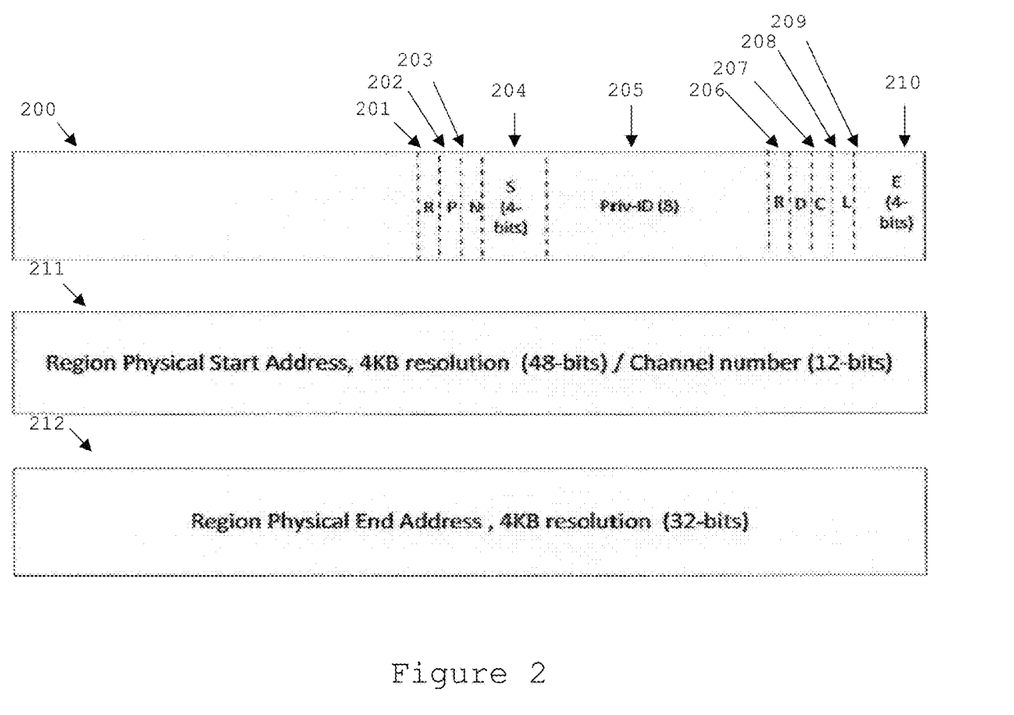
FIG. 2 shows the Initiate Side Control register.

FIG. 2 shows the control registers per region in the ISC where in register 200:

Bit 201 is a reserved bit;

Bit 202 do not replace an existing Priv-ID when set, pass through;

Bit 203 when set, makes outgoing transactions non-secure;

Bits 204 (4 bits) makes outgoing transactions secure (0xA);

Bits 205 (8 bits) holds the Priv-ID;

Bit 206 is reserved;

Bit 207 is a default region indicator;

Bit 208 when set, means use channel number, not address;

Bit 209 lock configurations;

Bits 210 (4 bits) enable region (0xA);

Register 211 holds the region physical starting address with 4 KB resolution (48 bits), or the 12 bit channel number; and Register 212 holds the region physical end address (32 bits).

The function of the ISC module is to:

Attach the Priv-ID. The Priv-ID is a source ID attached to identify the source of transactions in the system. Priv-IDs may be grouped by the DMSC to form logical security groups.

Assert, De-assert or pass-through secure bit.

Assert, De-assert or pass through Priv-bits.

The ISC may be built into Master/Initiator modules or attached to a port where the master/initiator enters the SoC fabric.

Firewalls play important role in implementing overall SoC security by providing mechanisms to assign and restrict device resources to a given master or to a Secure/Nonsecure/Priv/User world. Firewalls are placed at various data path points throughout the SoC to control access to protected assets.

Firewalls ensure that protected assets are only accessible by an allowed master in the selected operation mode (Secure, Nonsecure, Privileged (Priv), User, write, read and debug). In case of a violation, the firewall signals that the transaction is to be dropped and an appropriate violation code generated.

Figure 3:
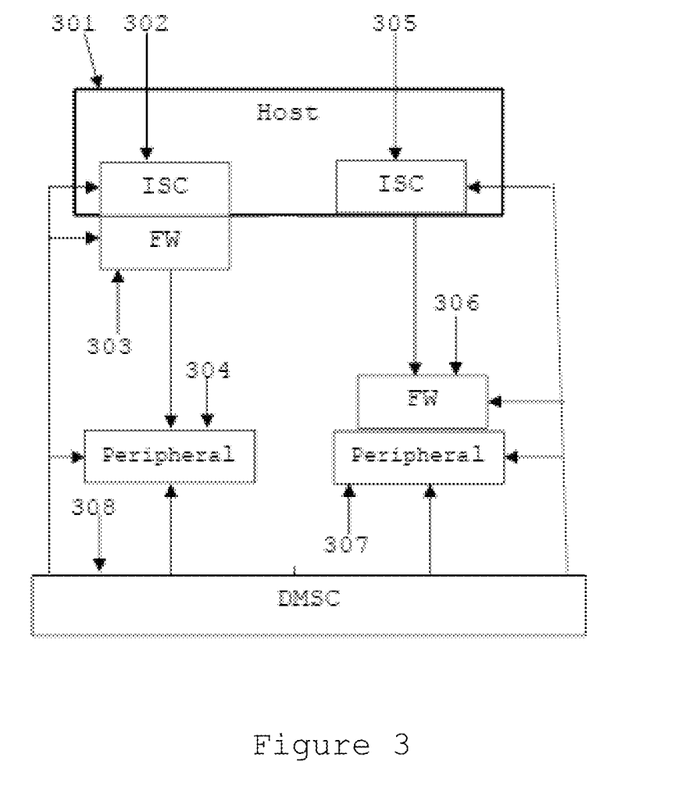
FIG. 3 shows a block diagram of a system using the firewall module.

FIG. 3 shows a system with two firewall configurations. In the first configuration, the firewall module is at the initiator side while in the second the firewall module is at the peripheral side. The peripheral may be a SRAM memory module, a DRAM memory module, an I/O peripheral module such as a UART or any other module that requires firewall protection.

Host 301 is connected to and may be integral with ISC module 302. The input of first firewall module 303 is connected directly to and is in close proximity to the output of first ISC module 302, and the output of first firewall module 303 is connected to first peripheral 304 which is the asset to be protected.

Host 301 is also connected to and may be integral with second ISC module 305. The input of second firewall module 306 is connected to the output of second ISC module 305, and the output of second firewall module 306 is connected directly to second peripheral 307 which is the asset to be protected. Second firewall module 306 is in close proximity to or may be integrated into second peripheral 307.

DMSC module 308 is connected to peripheral modules 304 and 307, firewall modules 303 and 306 and ISC modules 302 and 305 respectively.

Figure 4:
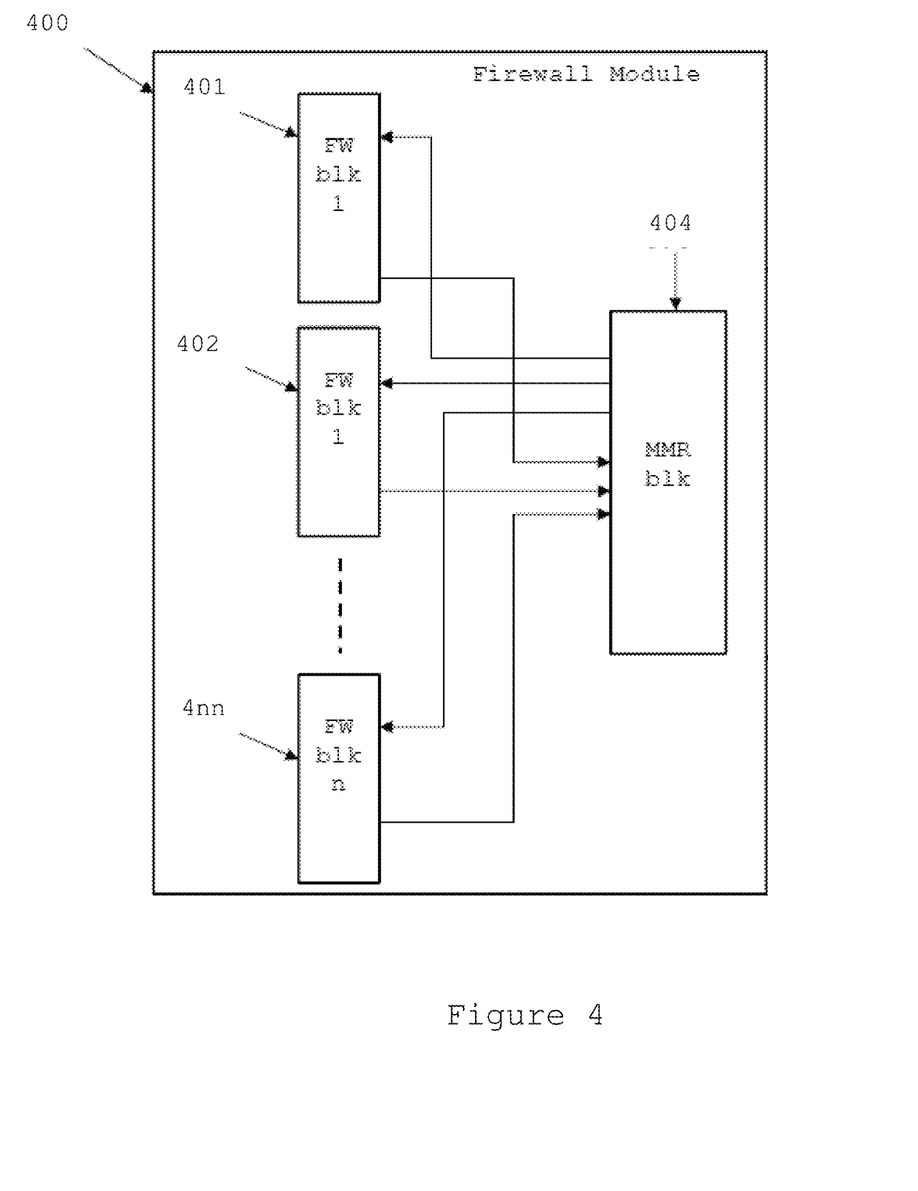
FIG. 4 is a block diagram of a firewall module.

As shown in FIG. 4, firewall module 400 consists of two sub-modules, a Memory Mapped Register block (MMR blk) 404 and one or more Firewall Blocks (FW blk) 401 through 4nn connected to said MMR blk. The FW blk implements firewall filter algorithms, by comparing incoming transaction parameters from a Host against the region(s) policies to give security indication to the Host module.

MMR blk 404 contains memory mapped registers that are configured per region by the DMSC. MMR blk 404 also contains the logic required for violation reporting and logging.

Firewall module 400 may support one or more firewall blocks that can monitor concurrent incoming transactions. Each FW Blk supports multiple regions (up to 24), where each region is defined by an address range to be checked with the associated access permissions. The firewall module does concurrent checks of the incoming transactions with all enabled regions.

Figure 5:
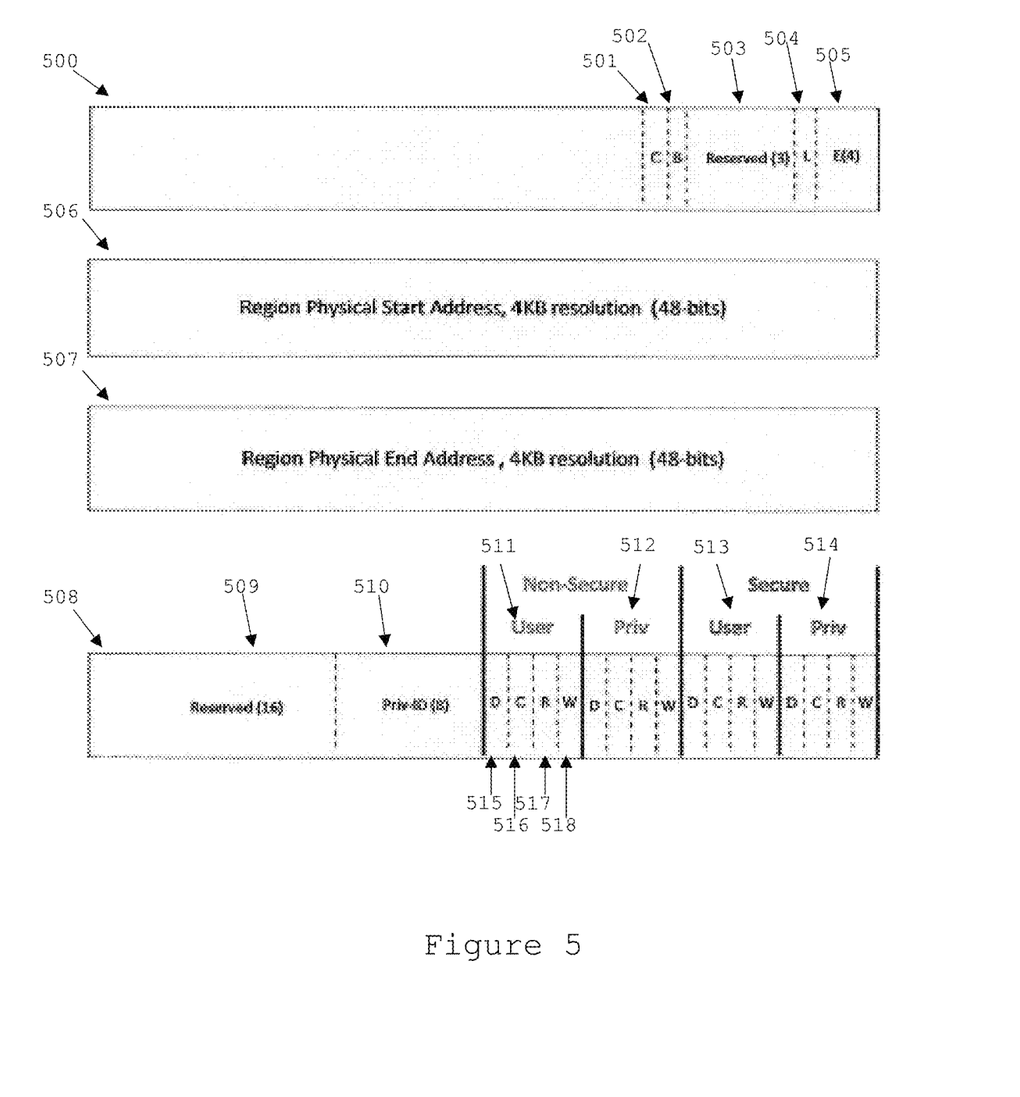
FIG. 5 shows the control register of the firewall.

FIG. 5 shows the firewall control registers for each region. There are at least 4 control registers for each region— registers 500, 506, 507 and 508. When multiple transactions access the region, register 508 is duplicated for each transaction with the appropriate content.

Bit 501 indicates to the firewall module whether the cacheable check should be enabled or ignored. Setting this bit ignores the cacheable check so that it cannot fail and the read and write bits then check the access. Clearing this bit enables the cacheable check so that cacheable transactions are allowed only when the cacheable permission bit is set.

Bit 502 indicates to the firewall module that the region is a background region.

Bit 503 reserved (3 bits).

Bit 504 is a lock bit. If the lock bit is set, the region configuration cannot be changed. This is a one-time change. The lock is typically used by a primary master to lock its resources and then pass firewall control to a secondary master.

Bit 505 (4 bits) enables a region. Setting this field enables the corresponding region and makes the firewall active for that region.

Register 506 holds the 48-bit region physical start address with 4 KB resolution.

Register 507 holds the 48-bit region physical end address with 4 KB resolution.

Figure 6:
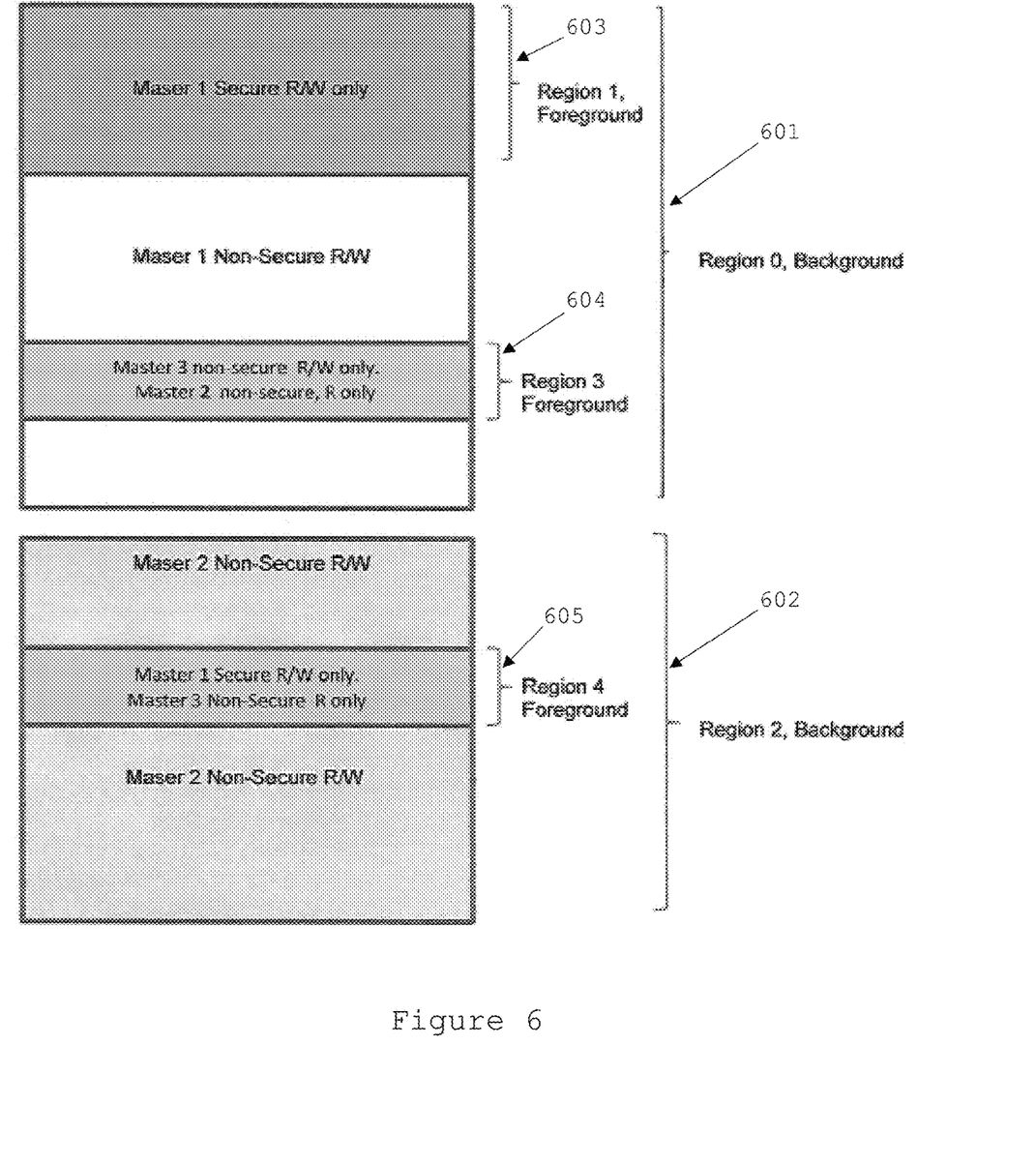
FIG. 6 shows memory organization.

Register 508 defines the permissions for a region. When multiple transactions exist, there is a similar register for each transaction, with all using the following bit assignments:

509 (16 bits) is reserved,

510 (8 bits) holds the Priv-ID,

Bits 511 (4 bits) hold s Non-Secure user controls, where each bit is defined as follows:

Bit 515 controls Debug mode;

Bit 516 controls whether the Transaction is cacheable;

Bit 517 controls Read enable;

Bit 518 controls Write enable;

Bits 512 (4 bits) holds Non-Secure Priv controls, with the same bit assignments as bits 515-518 in 511;

Bits 513 (4 bits) holds Secure user controls, with the same bit assignments as bits 515-518 in 511;

Bits 514 (4 bits) holds Secure Priv controls, with the same bit assignments as bits 515-518 in 511;

In case two regions overlap, the background bit 502 as defined in the control register 500 is used to select the appropriate permission to be used. The region whose background bit is not set is a foreground region that takes precedence and its permissions are taken into effect and the background region is ignored. This is shown in FIG. 6 where Region 0 (601) and Region 2 (602) are background regions (background bit set in the control register), and multiple non-overlapping background regions are allowed. Region 1 (603), Region 3 (604) and Region 4 (605) are Foreground regions that overlap the background regions. As an example, if an incoming transaction from a Host hits an address in Region 1, the permissions of Region 1 are applied to filter the incoming transaction, thereby completely ignoring the permissions of Region 0.

The firewall module also supports masking the addresses used in the compares if the transactions only support a smaller than 48-bit address. If the address width is less than 48 bits, then the addresses from the transaction and the region MMRs are masked to only allow the defined number of bits and those results are then used for the compare. For example, this allows a peripheral to be protected even though it only receives a 16-bit address while the software can still program the firewall with the full 48-bit address. In this example, the address width would be 16 and the firewall will mask out all but the lower 16 address bits so that the full 48-bit address programmed by the SW will still be compared correctly against the truncated transaction address given by the slave being protected.

The Firewall module has bypass capability that may be asserted by the DMSC. If this control line is asserted and the firewall module has not been configured since reset the module ignores all firewall checks and lets incoming transactions pass through.

If the firewall module has been configured and enabled, the module ignores the firewall bypass signal until the next reset.

When a region is set to be cacheable and cache mode=0, then for any transactions (cacheable or not) the firewall ignores the read and write checks so that it cannot fail due to these checks. This allows a write allocate cache to read a cache line even in write-only regions. As caches do not protect user and supervisor data from each other, the firewall allows cacheable access to the region when either the user has cacheable permission or the supervisor has cacheable permission given the security level requested (so a secure cacheable transaction is allowed if either secure user cacheable or secure supervisor is set to cacheable.

Figure 7:
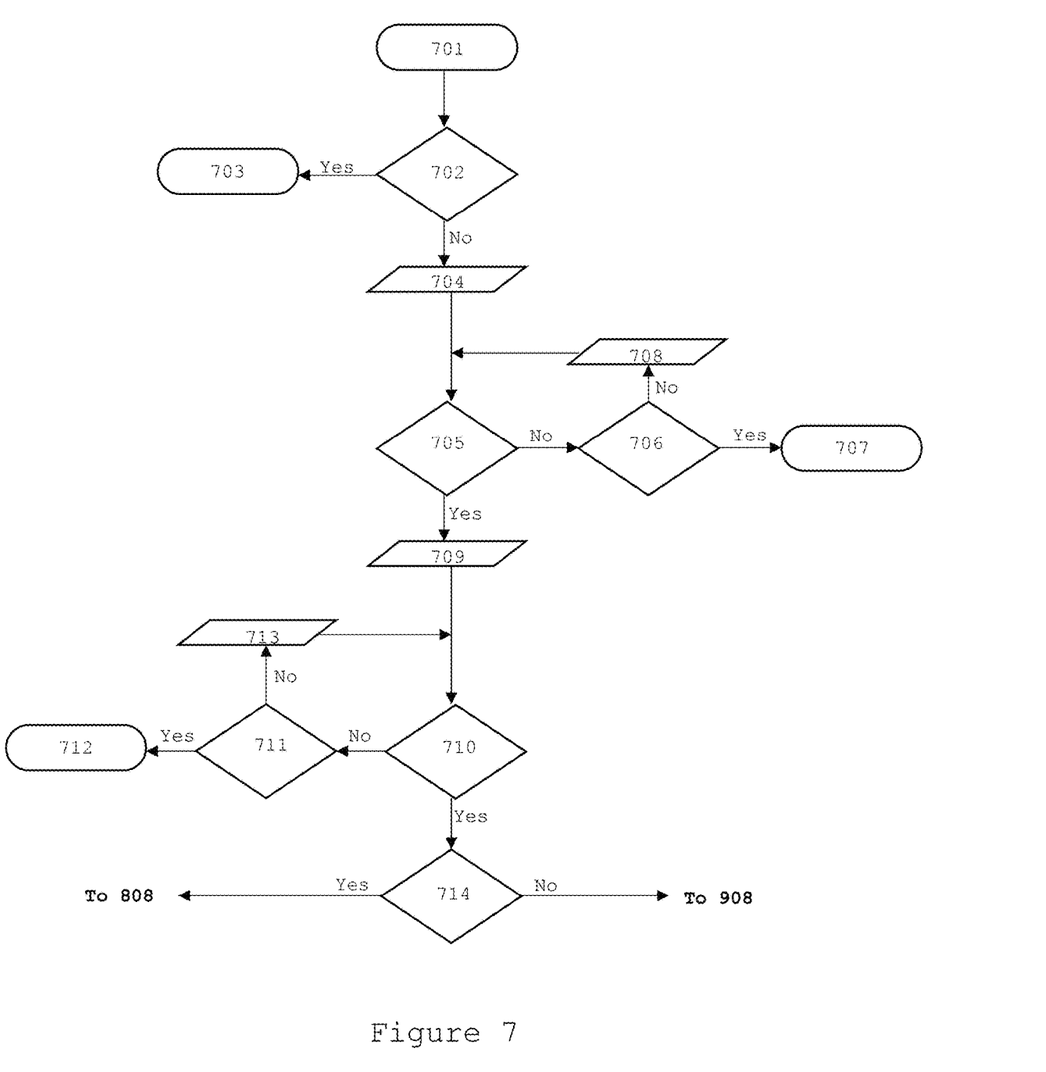
FIG. 7 is a flow chart of the firewall functions.
Figure 8:
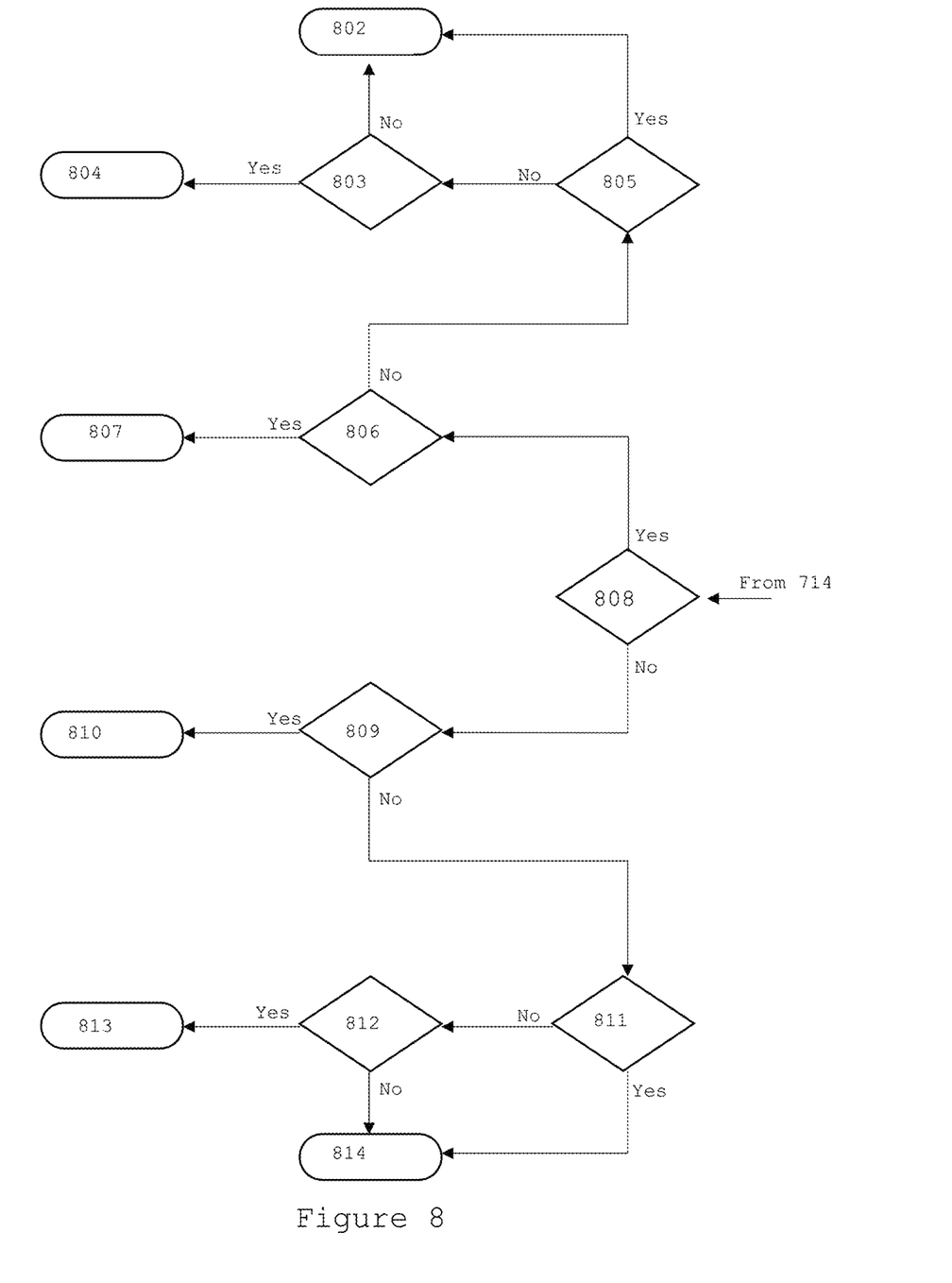
FIG. 8 is a continuation of the flowchart.
Figure 9:
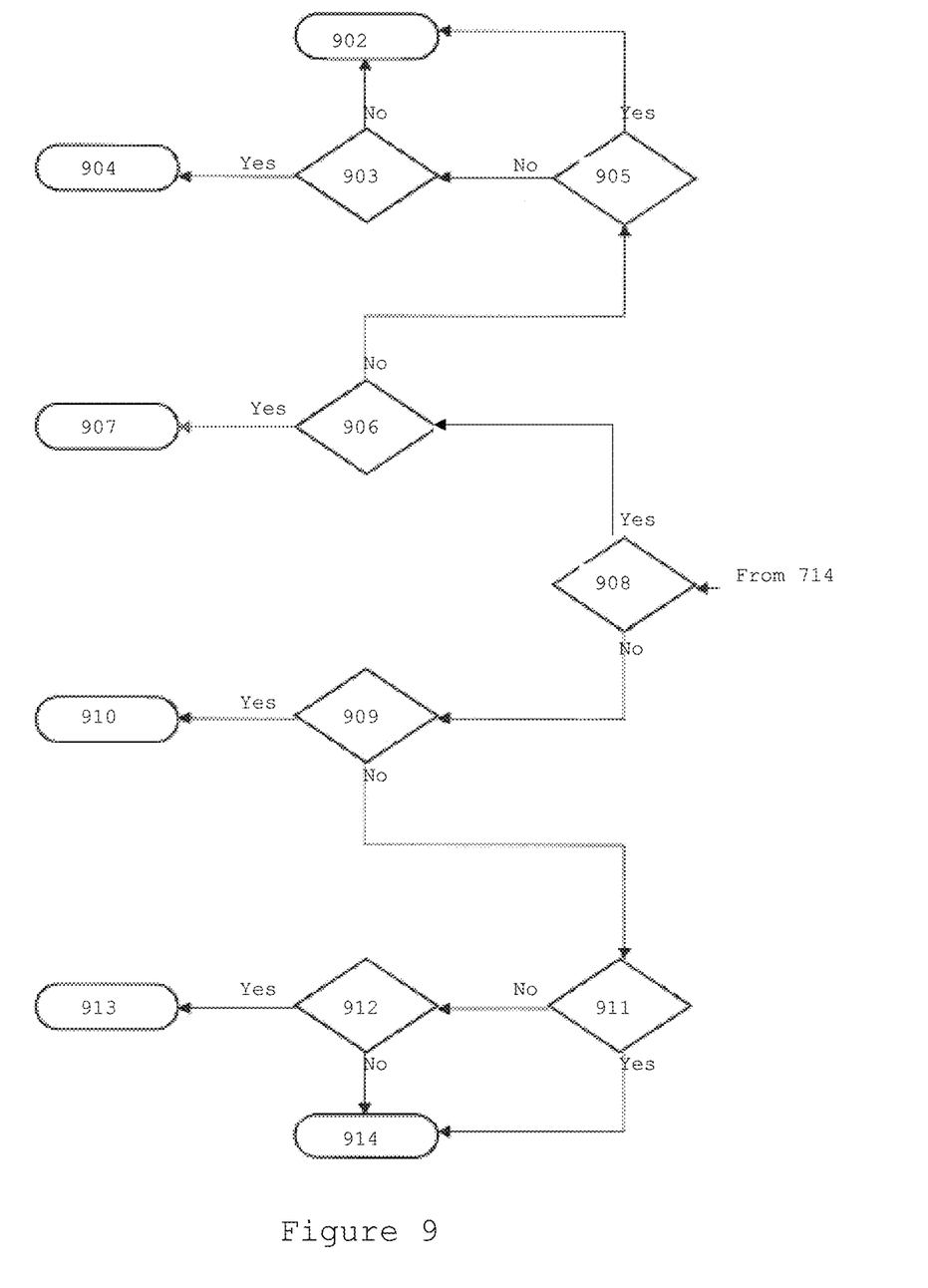
FIG. 9 is a further continuation of the flow chart.

When a region is enabled for debugging, then for any debug transactions the firewall ignores the read and write checks so that it cannot fail. This allows debug breakpoints to be set even in read-only regions of the memory.

plary implementation of the firewall, all the steps in the flow chart are executed in a single cycle.

We start at 701. In 702 we determine if the firewall is bypassed and no region is enabled. If yes, the firewall module is disabled in 703.

If no, region select R is set to 0 in 704.

In 705 we determine if the address of the transaction hits region R and if the region is enabled.

If no, in 706 we check if region R is the last region.

If it is, firewall violation is whitelisted in 707.

If it is not, we increment region select R in 708 and return to the input of 705.

If the result from 705 is yes we set Priv-ID slot P to 0 in 709.

In 710, we check if the transaction's Priv-ID matches P or if the check is to be ignored.

If no, we check in 711 if this P is the last Priv-ID for this region.

If yes, the Priv-ID is whitelisted in 712.

If no, Priv-ID slot P is incremented in 713, and we return to the input of 710.

TABLE 1

| Transaction Type | Transaction Attributes D, C, R, W | | | Firewall Region Permissions | | | | Firewall Cache mode | Firewall Result |
|---|---|---|---|---|---|---|---|---|---|
| | D | C | R/W | D | C* | R | W | CM | |
| Normal Write | 0 | 0 | W | — | 0 | — | 0 | 0 | Fail - No write permission |
| | 0 | 0 | W | — | 0 | — | 1 | 0 | Pass - Has write permission |
| | 0 | 0 | W | — | 1 | — | — | 0 | Pass - Region has cacheable permission |
| | 0 | 0 | W | — | — | — | 0 | 1 | Fail - No write permission |
| | 0 | 0 | W | — | — | — | 1 | 1 | Pass - Has write permission |
| Normal Read | 0 | 0 | R | — | 0 | 0 | — | 0 | Fail - No read permission |
| | 0 | 0 | R | — | 0 | 1 | — | 0 | Pass - Has read permission |
| | 0 | 0 | R | — | 1 | — | — | 0 | Pass - Region has cacheable permission |
| | 0 | 0 | R | — | — | 0 | — | 1 | Fail - No read permission |
| | 0 | 0 | R | — | — | 1 | — | 1 | Pass - Has read permission |
| Cacheable Write | 0 | 1 | W | — | 0 | — | — | 0 | Fail - No cacheable permission (CM = 0) |
| | 0 | 1 | W | — | 1 | — | — | 0 | Pass - Has cacheable permission |
| | 0 | 1 | W | — | — | — | 0 | 1 | Fail - No write permission (CM = 1) |
| | 0 | 1 | W | — | — | — | 1 | 1 | Pass - Has write permission (CM = 1) |
| Cacheable Read | 0 | 1 | R | — | 0 | — | — | 0 | Fail - No cacheable permission (CM = 0) |
| | 0 | 1 | R | — | 1 | — | — | 0 | Pass - Has cacheable permission |
| | 0 | 1 | R | — | — | 0 | — | 1 | Fail - No read permission (CM = 1) |
| | 0 | 1 | R | — | — | 1 | — | 1 | Pass - Has read permission (CM = 1) |
| Debug Write | 1 | 0 | W | 0 | — | — | — | — | Fail - No debug permission |
| | 1 | 0 | W | 1 | — | — | — | — | Pass - Has debug permission |
| Debug Read | 1 | 0 | R | 0 | — | — | — | — | Fail - No debug permission |
| | 1 | 0 | R | 1 | — | — | — | — | Pass - Has debug permission |
| Debug Cacheable Write | 1 | 1 | W | 0 | — | — | — | — | Fail - No debug permission |
| | 1 | 1 | W | 1 | 0 | — | — | 0 | Fail - No cacheable permission (CM = 0) |
| | 1 | 1 | W | 1 | 1 | — | — | 0 | Pass - Has debug and cacheable permissions (CM = 0, R/W ignored) |
| | 1 | 1 | W | 1 | — | — | — | 1 | Pass - Has debug permission and cacheable ignored (CM = 1, debug causes R/W ignored) |
| Debug Cacheable Read | 1 | 1 | R | 0 | — | — | — | — | Fail - No debug permission |
| | 1 | 1 | R | 1 | 0 | — | — | 0 | Fail - No cacheable permission (CM = 0) |
| | 1 | 1 | R | 1 | 1 | — | — | 0 | Pass - Has debug and cacheable permissions (CM = 0, R/W ignored) |
| | 1 | 1 | R | 1 | — | — | — | 1 | Pass - Has debug permission and cacheable ignored |

Table 1 illustrates the combinations of firewall region settings and transaction settings and the resulting actions by the firewall. The table assumes that the transaction secure and priv values have already been selected with the associated permissions (secure vs. non-secure and supervisor vs. user).

FIG. 7, FIG. 8 and FIG. 9 show the steps of the filtering algorithm. This is just a flow representation—in the exem- If the result from 710 is yes, we check in 714 if the transactions secure bit is set.

If yes, we check in 808 if the transaction's Priv bit is set.

If Yes, we check in 806 if transactions debug is set, and the region does not allow secure Priv debug, If yes, secure Priv debug violation is set in 807.

If no, we check in 805 if the region secure Priv cacheable bit is set in the permission register and cache mode is enabled.

If the result is yes, the transaction has passed in 802.

If the result is no, we check in 803 if there is a mismatch between the region's Priv read and Priv write permissions with the transaction's read/write permissions.

If the result is yes, a secure read/write violation is set in 804.

If the result is no, the transaction has passed in 802.

If the result from 808 was no, we check in 809 if the transactions debug is set and if the region does not allow secure user debug.

If the result is yes, a secure user violation is set in 810.

If the result is no, we determine in 811 if the region's secure user cacheable bit is set and if cache mode is enabled.

If yes, the transaction has passed in 814.

If not we check in 812 if there is a mismatch between the secure user read/write permissions and the transaction's read/write.

If yes, a secure user read/write violation is set in 813.

If no, the transaction has passed in 814.

If the result from 714 is no, we check in 908 if the transaction's Priv bit is set.

If Yes, we check in 906 if transactions debug is set, and the region does not allow non-secure Priv debug, If yes, secure Priv debug violation is set in 907.

If no, we check in 905 if the region non-secure Priv cacheable bit is set in the permission register and cache mode is enabled.

If the result is yes, the transaction has passed in 902.

If the result is no, we check in 903 if there is a mismatch between the region's nonsecure Priv read and nonsecure Priv write permissions with the transaction's read/write permissions.

If the result is yes, a nonsecure read/write violation is set in 904.

If the result is no, the transaction has passed in 902.

If the result from 908 was no, we check in 909 if the transactions debug is set and if the region does not allow nonsecure user debug.

If the result is yes, a nonsecure user violation is set in 910.

If the result is no, we determine in 911 if the region's nonsecure user cacheable bit is set and if cache mode is enabled.

If yes, the transaction has passed in 914.

If not we check in 912 if there is a mismatch between the nonsecure user read/write permissions and the transaction's read/write.

If yes, a nonsecure user read/write violation is set in 913.

If no, the transaction has passed in 914.

What is claimed is:

1. An electronic system comprising: a peripheral device including a memory divisible into a plurality of regions, wherein each region corresponds to a respective memory address range;
   security circuitry coupled to the peripheral device and including:
   a respective control register set for each one of the plurality of regions, wherein, for each said region, the respective control register set includes a first register configurable to store permission settings for the region, the first register including a first field to store first control bits for non-secure user transactions, a second field to store second control bits for non-secure privileged transactions, a third field to store third control bits for secure user transactions, and a fourth field to store fourth control bits for secure privileged transactions, and a fifth field to store a privilege ID;
   an input to receive a transaction that includes a transaction privilege ID, a security indicator configured to indicate whether the transaction is a secure transaction or a non-secure transaction, a privilege indicator to indicate whether the transaction is a user transaction or a privileged transaction, and
   wherein the plurality of regions include a first region, and wherein the security circuitry is configured to permit access to the first region using:
   the first control bits when the transaction privilege ID matches the privilege ID, the security indicator indicates the transaction is the non-secure transaction, and the privilege indicator indicates that the transaction is the user transaction;
   the second control bits when the transaction privilege ID matches the privilege ID, the security indicator indicates the transaction is the non-secure transaction, and the privilege indicator indicates that the transaction is the privileged transaction;
   the third control bits when the transaction privilege ID matches the privilege ID, the security indicator indicates the transaction is the secure transaction, and the privilege indicator indicates that the transaction is the user transaction;
   and the fourth control bits when the transaction privilege ID matches the privilege ID, the security indicator indicates the transaction is the secure transaction, and the privilege indicator indicates that the transaction is the privileged transaction.

2. The electronic system of claim 1, wherein each of the first, the second, the third, and the fourth control bits includes a respective cacheable permission bit to indicate whether caching is enabled, and wherein the transaction is a cacheable transaction depending on the value of the cacheable permission bit in the one of the first, the second, the third, and the fourth control bits used by the security circuitry to permit access to the first region.

3. The electronic system of claim 1, wherein the privilege ID includes a plurality of bits.

4. The electronic system of claim 3, wherein the privilege ID includes 8 bits.

5. The electronic system of claim 1, wherein each of the first, the second, the third, and the fourth control bits includes: a first bit to indicate whether a debug mode is enabled or disabled; a second bit to indicate whether caching is enabled; a third bit to indicate whether read access is enabled; and a fourth bit to indicate whether write access is enabled.

6. The electronic system of claim 1, wherein the peripheral device is an SRAM memory device.

7. The electronic system of claim 1, wherein the peripheral device is a DRAM memory device.

8. The electronic system of claim 1, wherein, for each region, the respective control register set includes:
   a second register to store a starting physical address of the region; and
   a third register to store an ending physical address of the region.

9. The electronic system of claim 8, wherein the second and third registers each include at least 48 bits.

10. The electronic system of claim 1, wherein the control register sets for the regions are part of a memory mapped register.

* * * * *